Aug. 22, 1933.　　　J. H. HUNT　　　1,923,379

DOUBLE INERTIA CHECK FOR SYNCHRONIZING CLUTCHES

Filed Jan. 16, 1932

Inventor

John H. Hunt

By Blackmore, Spencer & Flint

Attorneys

Patented Aug. 22, 1933

1,923,379

UNITED STATES PATENT OFFICE 1,923,379

DOUBLE INERTIA CHECK FOR SYNCHRONIZING CLUTCHES

John H. Hunt, Detroit, Mich., assignor to General Motors Corporation, Detroit, Mich., a Corporation of Delaware Application January 16, 1932. Serial No. 586,978

10 Claims. (Cl. 192—53)

This invention relates to change speed transmission mechanism and particularly to such mechanism as is used in motor vehicles. More specifically the invention is concerned with an improvement in combined frictional and toothed clutches operable in sequence to produce predetermined driving ratios.

In devices of the above kind it has been proposed to employ angular cam faces on a sliding jaw tooth element and on the movable element of the friction clutch, the engaging cam surfaces on the two parts functioning to prevent the engagement of the sliding jaw tooth member with its coacting jaw tooth member prior to the synchronization effected by the friction clutch. The axial component of the force acting between these cam faces has heretofore been resisted by the force manually applied to the shift lever.

It is an object of this invention to relieve the shift lever of the aforesaid axial component of the force acting between the cam faces.

More specifically it is an object to so relieve the shift lever by providing engaging parts on the shaft and on the sliding jaw clutch member to resist the said axial component.

Other objects and advantages will be understood from the following description.

On the drawing—

Figure 1:
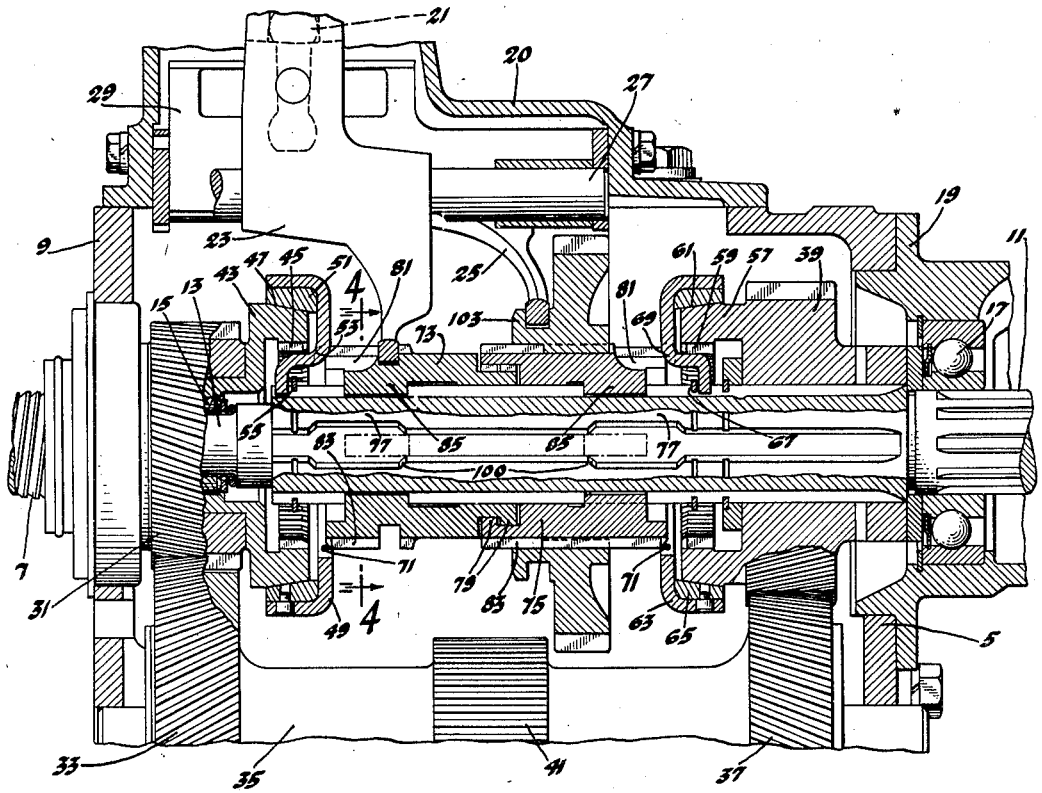
Fig. 1 is a longitudinal section through a transmission incorporating my invention.
Figure 2:
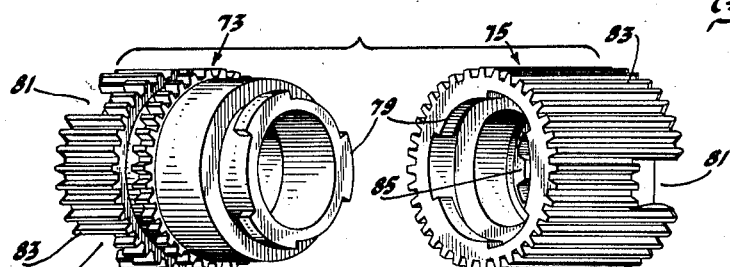
Fig. 2 is a perspective of the two-part sliding jaw clutch member, the parts being shown in separated relation.

Referring by reference character to the drawing, numeral 5 represents the housing for enclosing the transmission. At 7 is an input shaft rotatably supported in the front wall 9 of the housing. The spline shaft is indicated by numeral 11. It has a reduced end 13 rotatably supported by bearings 15 in the recessed end of shaft 7. At 17 is shown the rear bearing for shaft 11 located in the rear wall 19 of the housing. At 21 is the substantially conventional shift lever located in the cover 20, the shift lever being operable to actuate forks 23 and 25. Fork 23 is operable to make shifts into high and second speed and the fork 25 makes a shift for low speed and reverse. At 27 is shown one of the rods to slidably support the forks. While constituting no part of the invention there is illustrated an interlocking plate 29 operable in the usual way to prevent the reciprocation of but one of the forks at a time.

On the end of shaft 7 is a gear 31 meshing with the gear 33 on a countershaft 35 which is rotatably supported in the front and rear walls of the housing. Rigid with the countershaft is a second speed driving gear 37. It meshes with a gear 39 rotatably supported on the driven or spline shaft 11. At 41 is a low speed and reverse driving gear on the countershaft in engagement with a reverse idler, not shown.

Numeral 43 represents a flange on the end of shaft 7. The flange has internal teeth 45 and an external conical friction face 47. 49 is a friction drum having a conical friction surface 51 to engage surface 47. The drum 49 is provided with fingers 53 which enter spaces between the splines of the spline shaft as shown in Fig. 1. 55 represents a ring which affords a limited axial movement for the friction drum 49.

The gear 39 is similarly formed with a flange 57 having internal teeth 59 and an external conical friction face 61. At 63 is a second friction drum having at 65 a conical friction engaging friction face 61. Numeral 67 represents limiting means to restrict the axial movement of the friction drum 63. This drum 63 has fingers 69 entering between the splines of the spline shaft as in the case of drum 49. Numeral 71 is used to represent wires arranged as chords carried by the friction drums for a purpose to be described.

Figure 3:
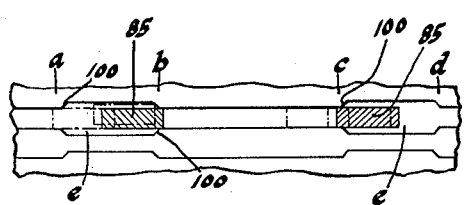
Fig. 3 is a developed view of the spline shaft.
Figure 4:
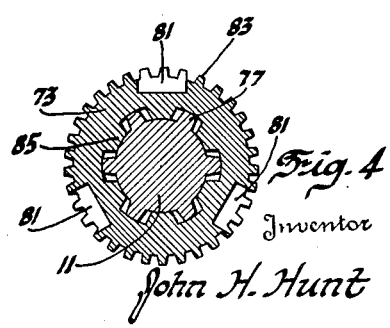
Fig. 4 is a section on line 4—4 of Fig. 1.

A two-part jaw clutch member 73 and 75 is slidably mounted on the splines of the spline shaft, there being provision for slight rotary movement between each of the parts 73 and 75 and the shaft as shown at 77 in Fig. 4. The adjacent ends of the two parts 73 and 75 have an interlocking engagement as at 79 of any preferred kind whereby the two parts may be assembled together for relative rotary movement but which engagement prevents axial separation except at predetermined positions. The ends of the clutch members 73 and 75 are cut out as at 81 to receive the fingers of the friction clutch drums as the jaw clutch members 73 and 75 slide axially in a direction to effect engagement of the external teeth 83 on said members with the internal teeth 45 or 59 on the flanges. The faces of the jaw clutch ends are bevelled to engage similar faces on the fingers of the movable friction clutch members. These engaging cam faces serve to prevent the axial movement of the jaw teeth into engagement with each other prior to the synchronization of the relatively movable parts by the friction clutch elements. Instead of making the spline engagement between the shaft and the members 73 and 75 continuous, each part 73 and 75 has a relatively short fin 85. The spline of the spline shaft is modified as best shown in Fig. 3. In the region from $a$ to $b$ from $c$ to $d$ the thickness of the spline is reduced so that there are wider spaces $e$ through which the fins 85 move as the jaw clutch member is reciprocated. It will be observed from an inspection of Figs. 1 and 3 that the walls between the relatively narrow and the relatively wide spaces are tapered. In the act of moving the jaw teeth members 73 and 75 toward the right or left it will be understood that the fins 85 become first located in the wider space $e$ in which they may be moved laterally out of registration with the narrow space at either end of the wide space $e$. The angular walls or shoulders between the wide space and the narrow space are represented by numeral 100. These angular walls have substantially the same angular relation to the axis of the shaft as do the cam faces on the movable clutch members as described above. Also, the relative position of the various parts must be such that the corners of the splines 85 shall be in contact with the inclined ends of the spaces 100 adjacent the neutral position of the jaw clutch elements at the same time that the cam faces between the fingers of the movable friction clutch element and the movable jaw clutch elements are causing the initial frictional engagement between the conical friction clutch elements when the jaw clutch elements are moved in the direction of engagement with the teeth 45 or 59. In order to permit the slight rotary movement of each jaw clutch element so that its fin may move laterally in the wider part of the spline space, there has been provided the relative axial movement between the two parts 73 and 75 described above.

The operation and the advantages of the construction are substantially as follows: When the jaw clutch member 73, 75 moves axially (let it be assumed that the combined members are moving to the left) the teeth 83 first engage the wire 71 on the drum 49 and push the drum to the left so that the face 51 engages the face 47. Owing to the unequal rate of rotation of the parts the drum 49 is then slightly rotated and the cam faces between the friction drum and the jaw clutch member engage and prevent further axial movement of the jaw clutch member until synchronization is effected. At the same time the movement of the jaw clutch member has carried the fin 85 from a position partly in the narrow space between the splines of the spline shaft to a position wholly in the wider space $e$. As a result of the engagement of the parts constituting the friction clutch, not only are the cam faces between the friction drum and the jaw clutch member 73 brought into engagement but the jaw clutch member with its fin 85 is rotated laterally within the wider region $e$ and the axial thrust resulting from the force operating upon the cam faces between the friction drum and jaw clutch member is received as a thrust on the angular wall 100 between the inner end of the wider region $e$ and the narrower region between the splines of the spline shaft. This engagement between the fin 85 and the wall of the spline shaft receives the axial thrust and prevents that thrust being transmitted through the jaw clutch member, the fork 23, and the manually operable lever 21. When the friction clutch has effected synchronization, the axial movement applied through the shift lever to the jaw clutch member easily overcomes the pressure on the aforesaid angular faces and the jaw teeth 83 are readily meshed with the teeth 45. In a similar way when the combined member 73 and 75 is moved to the right synchronization is first effected by the engagement of friction faces 61 and 65 and at the same time the jaw teeth 83 are kept from engagement with the teeth 59 by the cam faces on the member 63 and the member 75. Simultaneously the fin 85 engages the angular wall in the wider space of the spline shaft and receives the thrust.

In some constructions of this general kind there has been employed additional angular parts to ensure the firm contact of the frictional faces. With such devices there has been a tendency for one of the clutches to remain locked up when attempting to make use of the other clutch. With my construction there is entire freedom from any such a disadvantageous operation. The proposed new arrangement should afford whatever advantages there may be in the so-called self-energizing type of synchronization without what is believed to be the mentioned disadvantage commonly associated with such a device.

Although constituting no part of the invention the complete organization employs a sliding gear 103 operated on the external teeth of the member 75 and actuated by the fork 25. Through the reciprocation of the fork 25 by the manually operable lever 21 the gear 103 may mesh with the low speed driving gear 41 on the countershaft for driving at low speed or it may mesh with the reverse idler driven by gear 41 for driving in reverse.

It may be explained that the term "inertia check" is frequently used to define the action of the expedient embodying such parts as the cam faces on elements 49 and 73. This term is used since the inertia of freely rotating parts (such as gears 31, 33, 41, 37, 39) when separated from driving engagement with the engine by the release of the main clutch is used to check the engagement of the jaw clutch until the rates of rotation of the parts to be engaged have been synchronized by a friction clutch.

I claim:

1. In synchronizing transmission, a shaft, a pair of friction clutch elements one of which is movable, a pair of jaw clutch elements one of which is movable, shifting mechanism for the movable jaw clutch element, cam faces on the movable clutch elements engaged by the initial rotary movement of said movable friction clutch element, said cam faces operable to resist the axial movement of the movable jaw clutch element, said resistance having an axial component, and means to resist said axial component whereby the axial component is not transmitted to the shifting mechanism.

2. The invention defined by claim 1, said last-named means comprising cooperating parts on the shaft and the movable jaw clutch element.

3. The invention defined by claim 1, said last-named means comprising cooperating faces on the shaft and on the movable jaw clutch element, said faces being substantially coplanar with the aforesaid cam faces.

4. In combination, a clutch member having jaw teeth and a friction face, a spline shaft, a movable clutch element having a friction face, a movable clutch element having jaw teeth, said movable clutch elements having cooperating cam faces to constitute an inertia check, said movable jaw clutch element and said spline shaft having engaging faces to constitute a second inertia check, the faces constituting said inertia checks being in alignment when in operative position, whereby the second inertia check receives the axial thrust resulting from forces acting upon the first inertia check device.

5. The invention defined by claim 4, the spline shaft having a portion wherein the space between its splines is increased and having angular walls joining the relatively narrow and the relatively wide spaces, said angular walls constituting one of the engaging parts of the second inertia check device.

6. For use in a synchronizing transmission associated with a spline shaft and including parts to afford an inertia check device, a slidable two-part jaw clutch element, said parts being constructed for relative rotation but for combined axial movement, each of said parts having an independent fin located between the splines of the spline shaft.

7. The invention defined by claim 6, said spline shaft having a region with a relatively wide space between its splines and with angular walls between the relatively wider and narrower spaces, said fin and angular wall constituting an inertia check device to resist the axial thrust of the first mentioned inertia check device.

8. In synchronizing transmission mechanism, a spline shaft, a friction clutch including a member movable axially into engagement with the cooperating friction clutch member, a jaw clutch including a member movable axially to effect engagement of the frictional clutch, said slidable jaw clutch member and said movable friction clutch member having engaging cam faces to resist further axial movement of the movable jaw clutch member prior to synchronization, said jaw clutch member and said spline shaft having parts engaged by relative rotation to receive the axial thrust of the force operable upon the said cam faces.

9. The invention defined by claim 8, said last named parts consisting of an angular wall between a wider and narrower space between the splines of the spline shaft and a fin constituting a part of the sliding jaw clutch member moving axially in the spaces of the spline shaft, and movable laterally into contact with said angular wall.

10. The invention defined by claim 8, said last named parts consisting of an angular wall between a wider and a narrower space between the splines of the spline shaft and a fin sliding axially between the splines of the spline shaft and movable laterally into contact with said wall, said spline shaft wall and said first-mentioned engaging faces being coplanar when in operative position.

JOHN H. HUNT.